Dec. 30, 1941.   W. S. SACHER   2,268,516
AUTOMOBILE BRAKE
Filed Dec. 1, 1939   2 Sheets-Sheet 1

Inventor
William S. Sacher

Dec. 30, 1941.    W. S. SACHER    2,268,516
AUTOMOBILE BRAKE
Filed Dec. 1, 1939    2 Sheets-Sheet 2
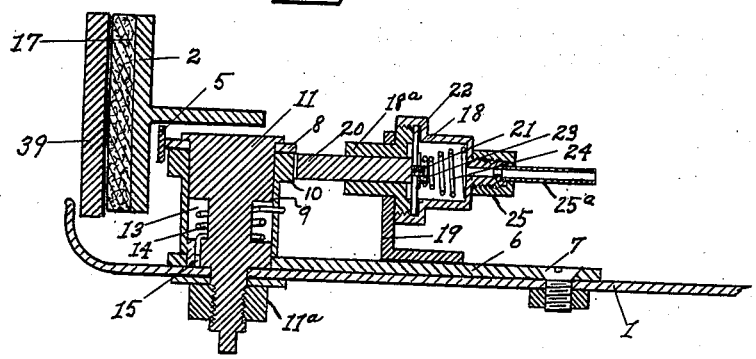
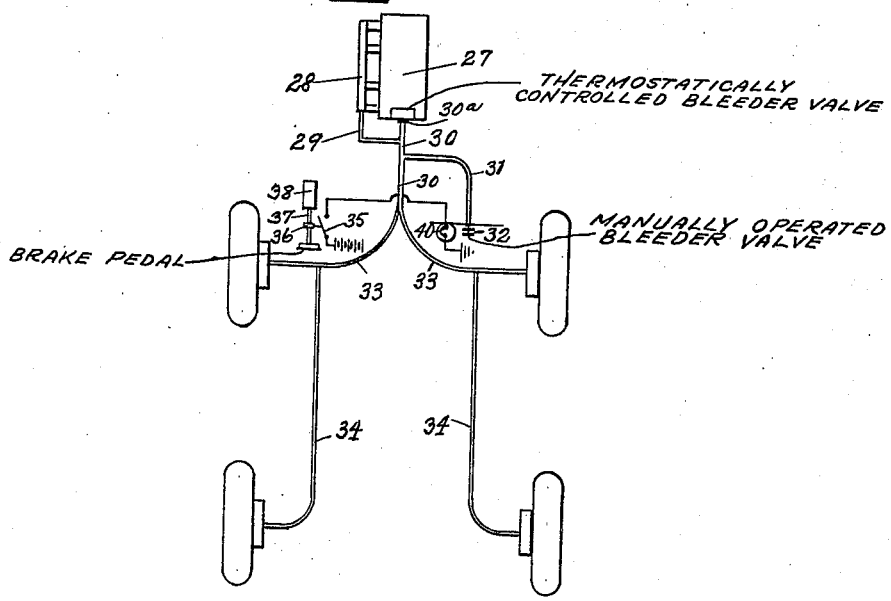
Inventor
William S. Sacher Patented Dec. 30, 1941

2,268,516

UNITED STATES PATENT OFFICE 2,268,516

AUTOMOBILE BRAKE

William S. Sacher, Pottstown, Pa., assignor of one-fourth to Isaac C. Shalkop, Philadelphia, Pa., one-fourth to Earl I. Keiser, Pottstown, Pa., and one-fourth to Fred B. Seeberger, Yeadon, Pa.

Application December 1, 1939, Serial No. 307,010

3 Claims. (Cl. 188—79.5)

This invention relates to automobile brakes of the hydraulic type, and particularly to means for automatically adjusting such brakes.

The object of this invention is to provide a simple efficient means whereby hydraulic automobile brakes may be automatically and simultaneously adjusted to maintain proper frictional relation between the brake drum and the brake band.

Another object of this invention is the provision of manually operated means at a single point of control for the simultaneous automatic adjustment of hydraulic automobile brakes.

Another object of this invention is the provision of a manually controlled automatic brake compensating means that is inoperative when the automobile engine is heated to driving temperature.

A further object of this invention is the provision of a signal means in combination with the hydraulic means controlling a hydraulic brake mechanism to indicate the need for brake adjustment. These and other objects and advantages will be readily apparent to those skilled in the art.

Figure 1:
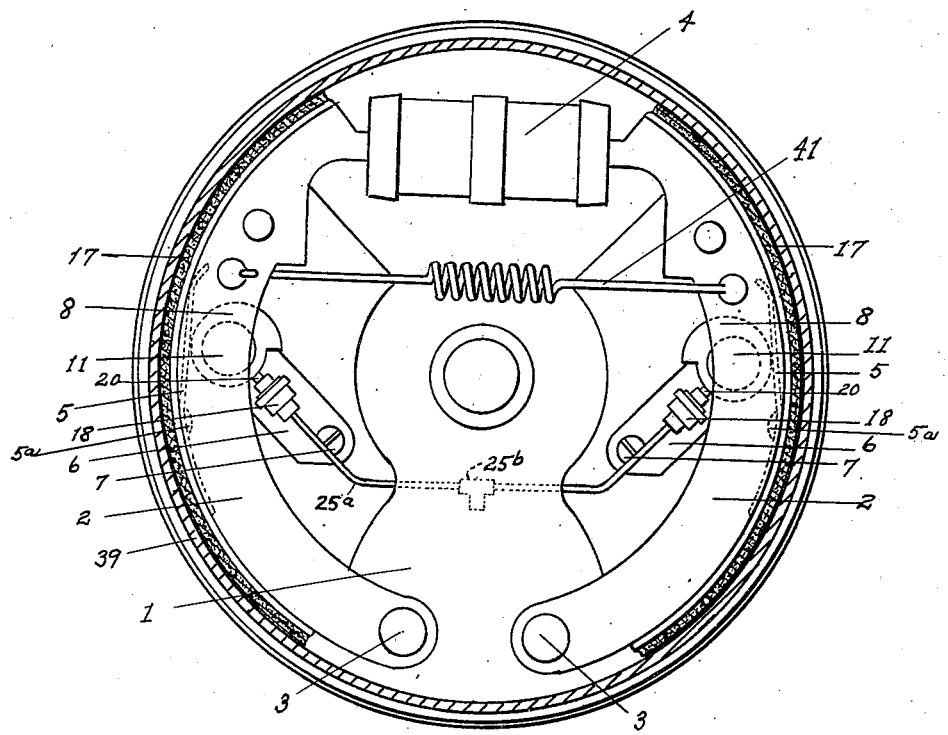
Figure 2:
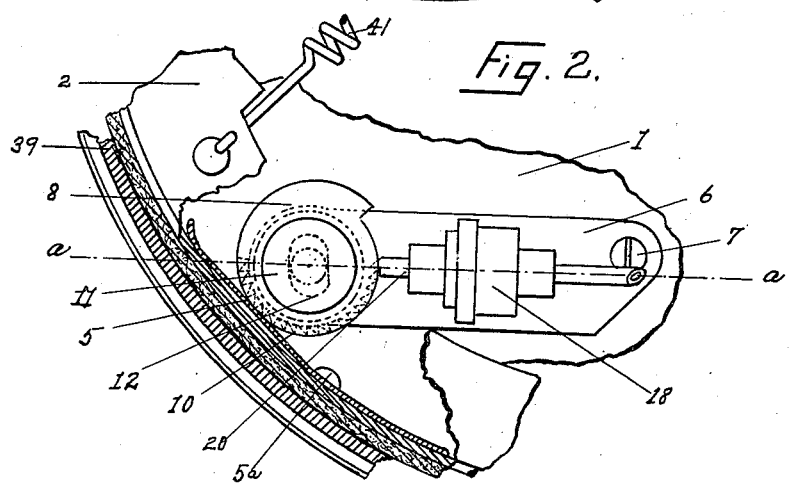

The improvement claimed is hereinafter fully described. In the accompanying drawings, Figure 1 is an elevation, partly in section, showing a brake mechanism embodying the features of the invention, and Figure 2 is a fragmental view of the brake mechanism partly in section showing the detail of the invention, and Figure 3 is a view taken on line $a$—$a$ in Fig. 2, and Figure 4 is a schematic view of an automobile showing the means for operating the automatic brake compensating mechanism.

The reference characters indicate the same parts in the several drawings.

In the practice of the invention the conventional backing plate 1 has the usual brake shoes 2 mounted on the adjustable eccentric studs 3 which are disposed in the backing plate 1 to secure the brake shoes in an articulating position at the lower ends thereof, the upper end of said brake shoes being disposed in seating members in the hydraulic pistons in the cylinder 4. Details of the hydraulic cylinder and pistons are not shown as they are well known standard equipment.

As both brake shoes are identically equipped with adjustment means, the description applies to both sides, one being a right hand action and the other left hand.

A flat spring steel member 5 is mounted adjacent the center leg of the T shaped brake shoe member 2, on the arcuate under face of said brake shoe on the side facing the backing plate 1. This spring member is shaped to permit a centrally disposed rivet or screw 5a to hold same rigidly to said shoe, the lower end of the spring following the arc of the brake shoe, and the top end resting on the tip of said spring to form the chord of an arc the segmental height of which shall be approximately .010 of an inch or any predetermined height desired, and the center of the chord shall be in direct line with the center of the cam adjustment means.

The automatic compensating means consists of a base member 6 articulatedly fastened to the backing plate 1 by means of a screw or bolt 7 at the lower end thereof. A cam 8 mounted upon a sleeve 9 having ratchet teeth 10, forms an integral unit which is rotatably held in position upon the upper end of the base member 6 by a headed bolt member 11 passing therethrough, and through a slotted opening 12 in the backing plate 1 to which it is held in the desired position by a nut 11—$a$. See Figs. 2, and 3.

The bolt 11 has a recessed portion 13 into which a torsional spring 14 is fastened at one end through a hole 15, the other end of said spring 14 engaging an opening 16 in the sleeve member 9, the torsional action of said spring upon being wound causes the cam sleeve 9 to rotate upon the bolt 11. The cam rise is developed to allow a maximum compensation equivalent to the thickness of the brake lining 17 upon the brake shoes 2.

A vacuum cylinder 18 is rigidly secured by angle plate member 19 to the base member 6 and has a pawl member 20 mounted in the head 18—$a$ of said cylinder 18. The pawl 20 has a threaded member 21 to which is rigidly secured an elastic diaphragm member 22 by means of a nut 23. The elastic diaphragm 22 is held in operative position to the cylinder head 18—$a$ by the cylinder 18. A spring 24 within the cylinder 18 holds the pawl 20 in operative relation with the ratchet teeth 10 on the sleeve 9.

Suitable copper tubing 25a having about $\frac{1}{32}''$ inside diameter is secured to the cylinder 18 by means of a nut 25, and both right and left hand cylinder tubes are joined to a T member 25b as shown in dotted lines in Figure 1.

Operation

In practice the device is operated as follows: the schematic diagram, Fig. 4, shows an automobile engine 27, and an intake manifold 28 which is suitably tapped for the vacuum line 29. This vacuum line 29 joins the line 30 which enters into the engine water jacket and has at its end a thermostatically controlled bleeder valve 30—a that breaks the vacuum when the engine has heated to a predetermined temperature less than the maximum operating temperature. Various types of thermostats in use in automobile engines which are adapted to become opened when the engine is hot, and to close when the engine is cold, may be used to control the operation of valve 30a. A line 31 leads from the line 30 to the dash inside the automobile and has a manually controlled valve 32 which may be closed. The valve 32 is of a type that is normally adapted to leave the end of the line 31 open to the atmosphere when retracted, and to close said end to the atmosphere when pushed inwardly. From the line 30 there extends lines 33 to the front wheel brakes, and from lines 33 there extends lines 34 to the rear wheel brakes, all the lines forming an unbroken vacuum line between the brake compensating control cylinders and the intake manifold, 28.

A switch 35 such as the conventional stop light switch, is actuated by an adjustable operating member 36 mounted on the piston rod 37 to the master hydraulic cylinder 38 which controls the hydraulic brakes. When the brake bands have worn to a point where more than the required clearance of .010 of an inch between the brake lining 17 and the brake drum 39 exists, it will be found that the piston rod 37 in the master cylinder 38 travels a greater distance, thereby causing the switch operating member 36 to close the switch 35 which lights a bulb 40 mounted on the dash to caution the driver of the need for brake adjustment. The brakes cannot be adjusted until the engine cools and the thermostatic bleeder valve in the vacuum line has closed.

After the engine has become cold and the brake drums are likewise cold, the operator starts the engine, puts his foot down on the brake and immediately closes the manual vacuum control valve 32 on the dash of the car. The vacuum suction to each brake compensating cylinder retracts all the pawls simultaneously thereby allowing the spring actuated cams to move forward the required amount to contact the springs 5 opposite each cam. These springs are sufficiently resistant to the spring actuated cam sleeve springs to prevent depression of said springs 5. Releasing the manually operated valve 32 immediately bleeds the vacuum line and allows all the pawls to return to operative engagement with the ratchet teeth on the cam sleeves. Each tooth is spaced to allow an adjustment of .005 of an inch of cam rise. The large spring 41 which retracts the brake shoes 2 has sufficient power to depress the chordal height of the arc between the spring 5 and the arc of the brake shoe 2 to allow the required .010 of an inch clearance between the brake shoe 2 and the brake drum 39 to prevent drag or frictional contact between the shoes and the drum.

It is obvious from the foregoing description that accidental adjustment of the brake shoes cannot be effected while the automobile is in operation. The engine must be cooled below the average operating temperature to permit the thermostatically controlled bleeder valve in the vacuum line to close, thereafter the manually controlled valve to operate the compensating means will become operative.

What is claimed as the invention and desired to be secured by Letters Patent, is:

1. In a brake mechanism of the character described, automatically adjustable stops for retractable brake shoes comprising; spring actuated adjustable stop members, pawl and ratchet means to secure the stop members in adjusted position, a vacuum controlled diaphragm means to actuate the pawl, a vacuum means, and manually operated means for controlling the vacuum.

2. In a brake mechanism of the character described, automatically adjustable stop members for retractable brake shoes comprising; adjustable stop members, spring members to actuate the stop members, ratchet and pawl means to secure the stop members in adjusted position, a vacuum controlled diaphragm means to actuate the pawl, a vacuum line from the automobile engine to the diaphragm means, and manually operated means for controlling the vacuum.

3. In a brake mechanism of the character described in claim 2, and a flat spring member secured to the inner face of the retractable brake shoe and having a predetermined clearance therebetween, said spring being interposed between the brake shoe and the adjustable brake stop.

WILLIAM S. SACHER.